Sept. 13, 1927.  F. E. BARKER  1,642,222
TEAPOT AND LIKE VESSEL FOR MAKING BEVERAGES BY INFUSION
Filed Nov. 30, 1926

Inventor:
F. E. Barker
by
Attys.

Patented Sept. 13, 1927.

1,642,222

UNITED STATES PATENT OFFICE.

FRANK ERNEST BARKER, OF BIRMINGHAM, ENGLAND.

TEAPOT AND LIKE VESSEL FOR MAKING BEVERAGES BY INFUSION.

Application filed November 30, 1926, Serial No. 151,793, and in Great Britain May 21, 1926.

This invention relates to improvements in tea-pots and like vessels for making a beverage by infusion.

In such vessels it is generally considered desirable that a strainer should be fitted to prevent tea-leaves, coffee-grounds or the like from being poured out with the infused tea or coffee, and it is common practice to provide over the inner end of the spout a fixed strainer or a removable strainer sliding into fixed guides.

A strainer fixed in this position is open to a number of objections such as that it is liable to be choked by tea-leaves, that it traps a certain amount of liquid in the spout, and this liquid quickly becomes cold and is liable to be spilt, and that it prevents the free escape of steam from the vessel.

The object of my invention is to provide an improved form of strainer which can be bodily removed from the pot for cleaning purposes, and which will not trap any liquid in the spout, and will permit the free escape of steam.

One practical form of my invention as applied to a tea-pot is illustrated as an example in the accompanying drawings in which:—

Figure 1:
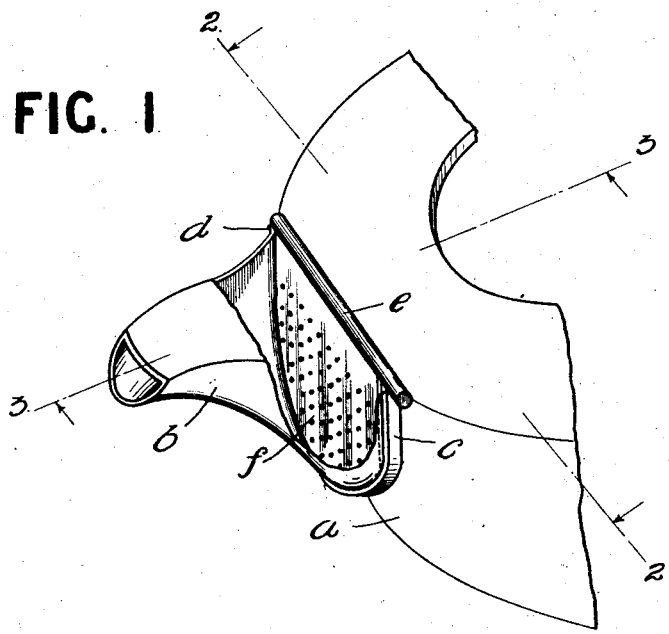
Figure 1, is a perspective view of the front part of a tea-pot with the spout partially broken away to show the strainer.
Figure 2:
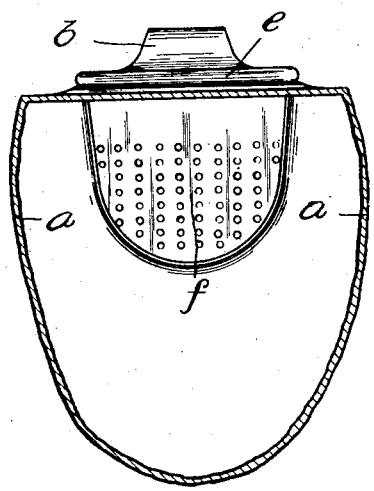
Figure 2, is a transverse section on the line 2—2 of Fig. 1.

In the drawings a metal tea-pot $a$ is shown fitted with a spout $b$ having a step or shoulder $c$ at its junction with the pot except along the flattened upper surface. In this upper surface a transverse slot $d$ is formed at the junction of the spout and pot, and at each end in line with the slot a semi-circular recess is cut in the shoulder $c$ to receive the rod $e$ to which the strainer plate $f$ is secured, and about which the plate can swing. The diameter of the rod $e$ is substantially equal to the width of the slot $d$ so that the presence of the strainer is not readily distinguishable.

The strainer itself consists of a flat perforated plate having substantially the outline of the shoulder $c$. The rod $e$ may be secured to or integral with the upper edge of the plate, and forms in effect a roller hinge about which the plate is free to swing.

Figure 3:
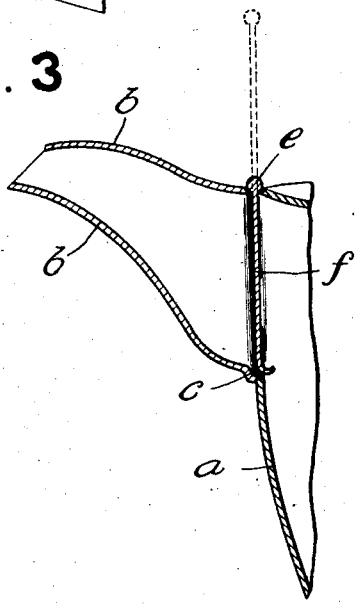
Figure 3, is a longitudinal section on the line 3—3 of Fig. 1, showing in dotted lines the strainer partially withdrawn.

When the tea-pot is in the normal horizontal position the shoulder $c$ at the inner end of the spout is inclined to the vertical, its lower edge being further from the vertical axis of the tea-pot than the upper edge, so that the lower edge of the strainer plate $f$ hangs clear of the shoulder as shown in Fig. 3, and any liquid in the spout can drain freely back into the pot. Immediately the pot is lifted and inclined, as in the act of pouring, the plate swings against the shoulder $c$ and effectively arrests any tea-leaves or other solid matter.

To remove the strainer for cleaning purposes, the ends of the rod $e$ are simply grasped between a finger and thumb, and the plate is drawn upwardly out of its slot.

I claim:

1. A vessel for making a beverage by infusion, comprising a hollow body, a spout leading out of the body, a slot in the upper surface of the body at the junction thereof with the spout, and a perforated strainer plate insertable in and free to be removed from the exterior through said slot and freely suspended about a transverse axis on a roller hinge at its upper end, the strainer being arranged to hang clear of the inner end of the spout opening when the vessel is horizontal, but to swing against the opening when the vessel is inclined.

2. A vessel for making a beverage by infusion, comprising a body, a spout leading out of the body, a slot at the junction of the upper end of the spout and the body, a perforated strainer plate insertable in and free to be removed from the exterior through said slot, and a cylindrical rod at the upper edge of said plate and semi-circular recesses at the ends of the slot in which the ends of the rod are rotatably supported, the plate hanging freely from the rod adjacent to the inner end of the spout opening and free to swing inwardly.

3. A vessel for making a beverage by infusion, comprising a body, a spout leading out of the body, an internal shoulder around the inner end of the spout opening, said shoulder being inclined slightly with respect to the vertical, a slot at the junction of the spout with the vessel, and a perforated strainer plate insertable in and free to be removed from the exterior through said slot, the said plate normally hanging vertically from a roller hinge at its upper end and so clear of the spout opening, but swinging against the shoulder around the spout opening when the vessel is inclined.

In testimony whereof I affix my signature.

FRANK ERNEST BARKER.